(12) United States Patent
Kögler et al.

(10) Patent No.: US 6,601,852 B1
(45) Date of Patent: Aug. 5, 2003

(54) METHOD AND APPARATUS FOR SEALING A SPACE

(75) Inventors: Markus Kögler, Buchloe (DE); Franz Heimpel, Affing (DE); Silvia Huber, Neusäss (DE); Peter Vogel, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/715,604

(22) Filed: Nov. 17, 2000

(30) Foreign Application Priority Data

Nov. 19, 1999 (DE) .......................... 199 55 766

(51) Int. Cl.⁷ .......................... F16J 15/08; F16L 17/00; F16L 21/02; F16L 55/00; E04B 1/682
(52) U.S. Cl. .......................... 277/314; 277/316; 277/603; 277/607; 277/609; 277/627; 277/652; 285/97; 285/196; 285/216; 138/108; 138/112
(58) Field of Search .................. 277/314, 316, 277/602, 605, 608, 609, 628, 637, 644, 645, 646; 138/93, 108, 112; 285/97, 96, 100, 196, 216

(56) References Cited

U.S. PATENT DOCUMENTS

| 672,475 | A | * | 4/1901 | Cavallaro | 166/125 |
|---|---|---|---|---|---|
| 2,306,160 | A | * | 12/1942 | Freyssinet | 277/605 |
| 2,816,575 | A | * | 12/1957 | Stokes | 138/109 |
| 3,190,679 | A | * | 6/1965 | Lester | 138/93 |
| 3,258,271 | A | * | 6/1966 | Hollingsworth | 137/228 |
| 3,339,931 | A | * | 9/1967 | Hundt et al. | 220/232 |
| 3,360,273 | A | * | 12/1967 | Hundt et al. | 264/267 |
| 3,821,340 | A | * | 6/1974 | Marks | 264/313 |
| 4,790,544 | A | * | 12/1988 | Kemp | 277/314 |
| 4,993,722 | A | * | 2/1991 | Gundy | 277/314 |
| 5,247,974 | A | * | 9/1993 | Sargent et al. | 137/899 |
| 5,819,389 | A | * | 10/1998 | Knutsen | 29/239 |
| 5,901,962 | A |   | 5/1999 | Wambeke |  |
| 6,095,207 | A | * | 8/2000 | Enders | 141/287 |
| 6,305,425 | B1 | * | 10/2001 | Korn | 138/106 |
| 6,325,384 | B1 | * | 12/2001 | Berry et al. | 220/226 |

FOREIGN PATENT DOCUMENTS

DE 4325966 2/1995

* cited by examiner

Primary Examiner—Anthony Knight
Assistant Examiner—Vishal Patel
(74) Attorney, Agent, or Firm—Sidley Austin Brown & Wood, LLP

(57) ABSTRACT

For sealing an annular space (4) between opening (2) in a wall or similar, member (1) and an object (3), extending through the opening (2), by introducing a sealing agent into the space (4), at least one bag (9, 10), into which the sealing agent is introduced, is positioned in the space (4). For this purpose, a supporting element (5, 6) is used, which can be positioned in the opening and to which a bag (9, 10) is fastened. The annular space (4) can be sealed easily and also liquid-tight in this manner.

12 Claims, 2 Drawing Sheets

METHOD AND APPARATUS FOR SEALING A SPACE

BACKGROUND OF THE INVENTION

The invention is directed to a method of sealing an annular space between a laterally closed oprning through a wall or similar element and an object extending through the opening. In addition, the invention is directed to an apparatus for sealing the annular space between a laterally closed opening through a wall or similar structure and an object extending through the opening.

For sealing openings into a house or similar structure through which pipes or cables are passed through the openings from the outside to the inside, an annular space is usually formed between the pipe or cable and the wall and can be sealed in different ways. On the one hand, mechanical seals can be used where solid sealing elements are introduced into the space and seal it positively or by elastically pressing it against the surface of the opening. On the other, strictly chemical sealing materials can be used. The annular space here is filled with a reactive chemical system, which cures or hardens and closes off the annular space. Inorganic systems, such as mortar or the like or organic systems, such as sealing compounds, polymeric foams, etc. are used. Last, but not least, chemical-mechanical sealing procedures can also be used. For these, the end faces of the annular space usually are encased mechanically, and filled with a chemical filling system.

However, mechanical solutions are relatively expensive, time consuming and work intensive during the installation and, moreover, limited to pipes or cables and wall openings of certain external diameters. Chemical solutions, which relate to the filling of the annular spaces with sealing compounds, foams or mortars, do not have these disadvantages; however, they do not, in general, guarantee permanent sealing against the entry of moisture or liquids, such as water. Frequently, this is due to the permeability of the material itself, when open cell foams are used, and to the deficient adhesion to different critical surfaces, as well as to the incomplete filling of the remaining opening by the user.

SUMMARY OF THE INVENTION

It is a primary object of the invention to provide a method and an apparatus of the type mentioned above, so that an annular space of the type named can be filled or sealed rapidly and reliably, using simple means.

With respect to the method, this object is accomplished by positioning at least one bag in the annular space and supplying a sealing agent into the bag and filling the annular space. With respect to the apparatus, on the other hand, the object is accomplished by inserting a supporting element into the annular space within the opening, and securing at least one bag to the supporting element for fitting into the annular space and arranged to receive a sealing agent. Advantageous developments of the invention are set forth in the dependent claims.

A method embodying the invention for sealing a laterally closed annular space between an opening present in a wall or similar member and an object extending through the opening by introducing a sealing agent into the space is distinguished owing to the fact that at least one bag is positioned in the space and that the sealing agent is brought into the bag.

By these means, it is achieved that sufficient sealing agent always remains in the space, so that the latter is sealed completely and securely. The sealing agent cannot emerge from the annular space, since it is prevented from doing so by the bag. On the other hand, since a bag is used, it is also not necessary to encase the annular space, so that the latter can be sealed rapidly and simply. The sealing agent, placed in the bag, presses the bag against the object and against the peripheral surface of the opening present in the wall, so that, depending on the nature of the surface of these parts, the seal is fixed in the annular space. At the same time, leakproofness against the penetration of moisture is achieved.

Pursuant to a further very advantageous development of the invention, a porous bag, such as a bag consisting of a woven fabric, can also be used as the bag. The bag accordingly has a low permeability, so that, after it is completely filled, it is possible for some of the sealing agent to emerge through the weave of the bag. In this way, an even firmer connection with the opening surface is brought about, which furthermore seals even better against the entry of moisture or liquid.

As the sealing agent, curable or hardenable foam systems can be used. All polymer foams, which can be processed at building sites, are used. Usually, these are polyurethane foams, which may be single component foams or multi-component foams. The foams may be cartridge foams or aerosol can foams, which are one-component or two-component foams, two-component foams being preferred. Moreover, epoxy foams and silicone foams can also be used for this purpose. Ideally, swellable foams are used, which reliably produce watertightness, even in the case of critical surfaces, on which adhesion cannot be achieved.

If the diameters of the opening and of the object lying in the opening are known, it is also possible to place premeasured amount of sealing agent into a respective bag. The amount of sealing agent, accordingly, can be preadjusted optimally for the purpose required, so that, in every case, sufficient sealing agent is brought into the annular space, and so as to prevent the latter remaining permeable.

Depending on the shape and size of the bag, one or more bags can be positioned in the annular space distributed in the circumferential peripheral direction of the object. Moreover, before the object is brought into the opening, the bags can be disposed within the opening, after which the object is then placed in the opening so that the bags come to lie between the object and the peripheral wall of the opening. It is, however, also possible to place the bags in the opening only after the object has been placed in the opening.

Pursuant to a different advantageous development of the invention, the bags are held by a supporting element and can be positioned in the space owing to the fact that the supporting element is introduced at least partially into the opening. Using the supporting element, the bag can be positioned at a desirable place within the opening and the bag is prevented from falling out at the rear because of the limited length of the supporting element.

The bag is filled through an inlet, present in the supporting element, with the inlet being connected over a suitable channel with the bag.

The bag can be filled with sealing agent owing to the fact that as a polymer foam is introduced into the bag over the inlet from a dispenser or from a container of predetermined size. In the last mentioned case, the container, in which the premeasured amount of sealing agent is present, can be connected temporarily with the supporting element. The sealing agent can then be transferred from the container into the bag relatively safely and without the danger of contamination, since the danger no longer exists that the sealing agent can emerge to the outside in the region of the inlet.

The inventive apparatus for sealing an annular space between an opening, present in a wall or other wall, and an object, extending through the opening, is distinguished, as already mentioned, owing to the fact that it has a supporting element, which can be inserted into the opening and to which at least one bag for accommodating a sealing agent is fastened. The unit of the supporting element and bag accordingly can be positioned within the opening in the annular space region in order to ensure sealing there, which is also liquid-tight.

After the supporting element has been positioned between the object and the wall in the region of the opening, the bag, fastened to the supporting element, depending on the construction of the device, can come to lie between the object and the wall or at a surface of the supporting element spaced from the object, that is, between the supporting element and the wall. In the first-mentioned case, the bag, while being filled with sealing agent, would press the object and the wall and, with that, provide a liquid-tight seal. On the other hand, for the last-mentioned case, the bag, filled with sealing agent, would press, on the one hand, against the wall and, on the other, press the supporting element against the object. In this case also, a liquid-tight seal can be provided, especially in the region between the supporting element and the object, if both parts, closely fitting, lie one upon the other or at least one of these parts consists of an elastic material, such as a plastics material.

In accordance with one embodiment of the invention, the supporting element itself can be constructed as a sheath and carry a tubular bag extending in its circumferential peripheral direction. For sealing purposes, the sheath would in this case first of all be passed into the opening, so that the object subsequently can be pushed through the sheath. After that, the tubular bag is filled with the sealing agent or material. The internal diameter of the sheath would then be adapted to the external diameter of the object, if the latter is a pipe or a cable.

On the other hand, the supporting element could also be constructed so that it extends only over a portion of the periphery of the object. For pipes or cables, this would mean that the supporting element could also be constructed as a half shell-shaped or partially shell-shaped, and the bag once again extending in tubular fashion in the peripheral direction of the supporting element so configured. Supporting elements of this type can be used if pipes or cable are already in the opening and the corresponding annular space is to be sealed subsequently. The partially shell-shaped or half shell-shaped supporting elements with the appropriate tubular bag are inserted here in the front end of the annular space.

In yet another development of the invention, the supporting element may have a flange at the front side of the wall, the external diameter of which is selected so that it is greater than the internal diameter of the opening in the wall. This ensures a secure positioning of the supporting element relative to the wall and, therefore, a secure positioning of the bag within the annular space, which is connected with the supporting element.

One example of the invention is described in greater detail with reference to the drawing in which,

DETAILED DESCRIPTION OF THE INVENTION

Figure 1:
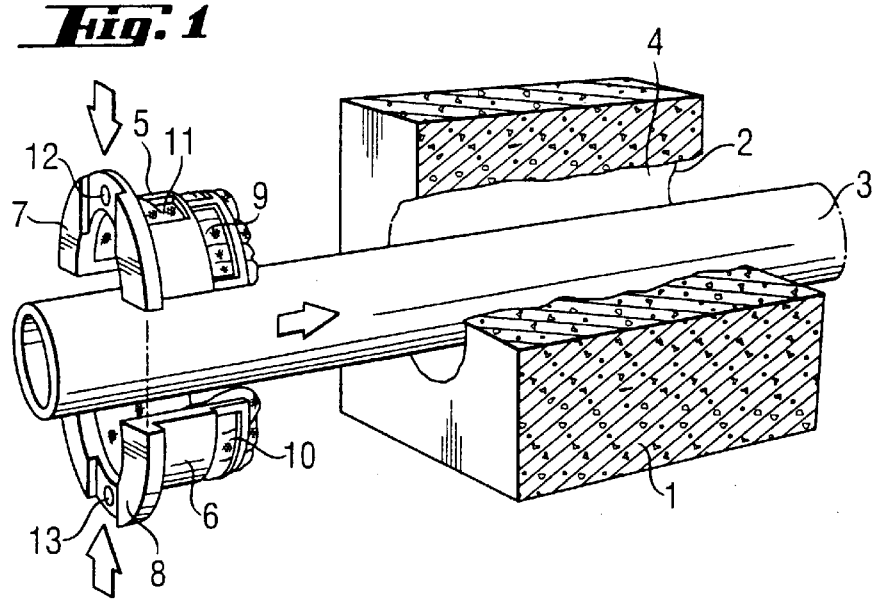
FIG. 1 is a perspective view of the invention illustrating an arrangement where two half shell-shaped supporting elements have been placed on a cylindrical object, but have not yet been inserted into an opening through a wall.

FIG. 1 shows a wall 1, which may be the wall of a building. Within the wall 1, there is a laterally closed opening 2 with a known internal diameter. This opening 2 is, more or less, hollow cylindrical in shape. A cylindrical object 3, such as a cable or a pipe, passes through the opening 2. Between the inner wall of the opening 2 and the object 3, there is an annular space 4.

As can be seen particularly in FIG. 1, initially, two half shell-shaped supporting elements 5 and 6 are placed radially outwardly about the object 3 in order to seal the annular space 4. The supporting elements 5 and 6 have an internal diameter, which corresponds to the external diameter of the object 3. Their wall thickness is selected so that they can be easily pushed in the axial direction of the object 3 into the opening 2. At their front and free end, the supporting elements 5 and 6 in each case have an outwardly projecting flange or peripheral flange 7, 8. The flanges form stops so that the supporting elements 5 and 6 are not pushed further into the opening 2. For this purpose, they come up with their inner side against the wall 1. If the supporting elements 5 and 6 have been placed completely about the object 3, they are essentially in contact with one another along their longitudinal or axially extending sides.

Each of the supporting elements 5 and 6 has a porous woven bag 9 or 10 at its end face opposite the flange 7 or 8. The woven bags 9, 10 initially are folded together and, in this state, are on the surface of the supporting elements 5 and 6 spaced from the object. The woven bags themselves are constructed in tubular fashion, closed off at their ends and extend in the circumferential peripheral direction of the supporting elements 5 and 6. Each of the woven bags 9, 10 is connected with an inlet 12, 13 over, for example, a tubular duct 11, which is at the free end face of the respective supporting element 5, 6. Over this inlet 12, 13, a curable foam is supplied through the respective tubular duct 11 to the respective bag 9, 10.

Figure 2:
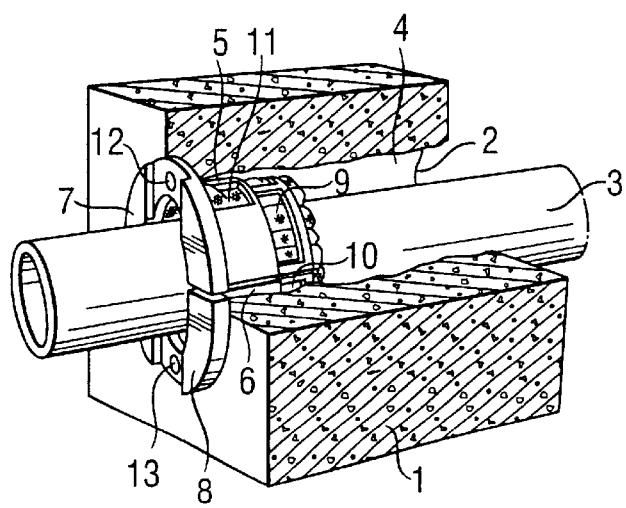
FIG. 2 is a perspective view similar to FIG. 1, however, where the supporting elements have been pushed into the opening.

FIG. 2 shows an arrangement, in which the two supporting elements 5, 6 have been pushed into the opening 2. They have adapted to the object 3, lying close to it. The flanges 7, 8 come up against the surface of the wall 1 and, with that, fix the position of the supporting elements 5, 6 relative to the wall 1. The corresponding applies for the woven bags 9, 10, since they are firmly connected with the respective supporting elements 5, 6. They are now also in the interior of the opening 2.

Figure 3:
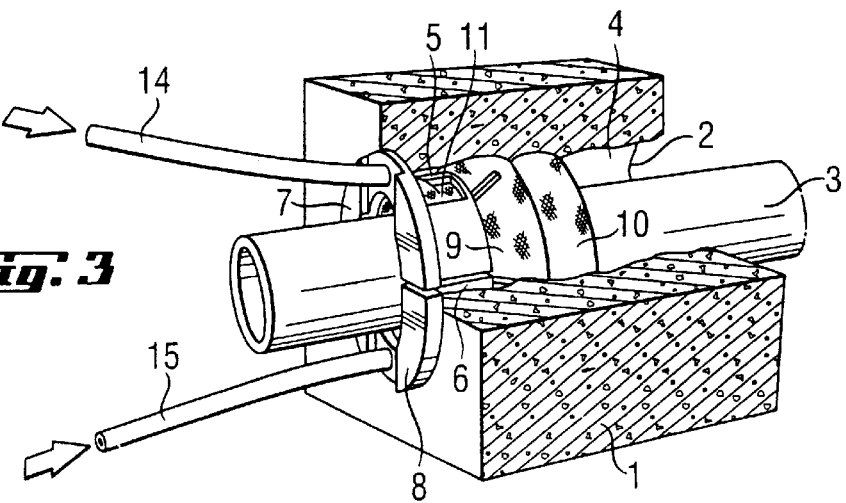
FIG. 3 is a perspective view similar to FIGS. 1 and 2 where the tubular bags, connected with the supporting elements, have been filled with a sealing agent.

As can be seen in the following FIG. 3, the woven bags 9, 10 have now been filled with sealing agent. For this purpose, the inlets 12, 13 in FIG. 3 are connected with feeding ducts 14, 15, in order to be able to supply sealing agent through them. In this connection, the sealing agent, such as a curable polymer foam or the like, is supplied in an amount sufficient so that the tubular bags 9, 10 can unfold. They now come to lie partly above the respective supporting elements 5, 6 and partly also directly on the object 3. The woven bags 9, 10 are filled with sealing agent to such an extent, that the woven bags 9, 10, are pressed firmly against the peripheral surface of the opening 2 and firmly against the object 3 or the supporting elements 5, 6, in order to be able to press the latter also against the object 3. A good moisture-tight seal in the annular space 4 is obtained in this way. If some part of the sealing material emerges from the woven bags 9, 10, there is additional adhesion to the elements 1, 3, 5, 6, which affords an even better sealing and to still better sealing properties of the seal in the annular space 4. The woven bags 9, 10 can unfold in the longitudinal direction of the opening 2 in the direction of the free ends of the supporting element 5, 6 to such an extent, that an essential part of the opening 2 is also filled with sealing agent.

In the case of one embodiment, given by way of example, the peripheral woven bag, connected with a sheath, is foamed with a two-component polyurethane aerosol can foam. A sample borehole in concrete, with an internal diameter of 100 mm, through which a polyethylene pipe with an external diameter of 40 mm is passed, is used. The remaining annular space is filled completely and liquid-tight in this manner.

Figure 4:
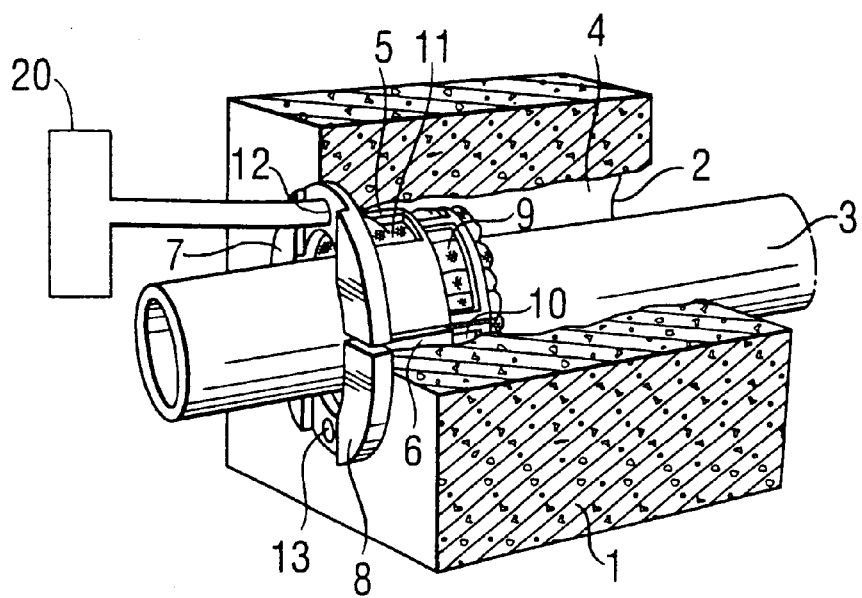
FIG. 4 is a schematic showing of a container with a premeasured amount of sealing agent to be filled into the tubular bags.

As shown in FIG. 4, a container 20 with a premeasured amount of sealing is arranged to be inserted into the tubular bags through the inlet 12.

What is claimed is:

1. A method of permanently sealing an annular sealing space (4) between a laterally closed opening (2) having an axial direction through a wall or similar structure (11) and an object (3) extending inwardly and spaced inwardly from through the opening, said opening (2) having a circumferentially extending peripheral surface through the wall and an entrance into the opening, comprising the steps of mounting a plurality of bags (9, 10) on a plural part supporting element (5, 6) sized to fit into and to form a closure wherein the surface fits into the opening (2) with the bags constructed in a tubular and folded fashion and secured to the supporting element and being initially empty, the plural part supporting element is a split annular member, inserting the supporting element with the bags at least partially in the axial direction into the opening, and with the bags spaced inwardly of the opening (2), filling the bags (9, 10) with a curable sealing agent and unfolding and expanding the bags, the curable sealing agent, after being cured, providing permanent sealing contact with the object (3) and with the circumferentially extending peripheral surface of the wall or similar structure of said laterally closed opening (2).

2. A method, as set forth in claim 1, comprising the step of inserting a premeasured amount of the sealing agent into the bag (9, 10).

3. A method, as set forth in claim 1, comprising the step of using a curable foam as the sealing agent.

4. A method, as set forth in claim 1, comprising the step of using the bags with a porous construction so that the sealing agent can pass through the porous construction.

5. A method, as set forth in claim 1, comprising the step of filling said bags (9, 10) through an inlet in the supporting element (5, 6).

6. An apparatus for sealing an annular space (4) between an axially extending laterally closed opening (2) through a wall or similar structure (1) having an entrance into the opening and an object (3) extending through the entrance into the opening, the apparatus comprising a plural part supporting element formed as a split annular member (5, 6) and plural tubular bags are arranged to extend at least in part in the axial direction through the entrance into the annular space within the opening and to extend circumferentially about said object (3), and form a closure of the entrance into the opening, the plural tubular bags (9, 10) secured to said supporting element (5, 6) and initially in an empty condition so that said bags are spaced inwardly of said opening, said bags in the empty condition are folded on the supporting element, and an age hardening sealing agent is filled into said tubular bags (9, 10) to expand said bags into permanent sealing contact with said object (3) and with a circumferentially extending surface of said opening (2) and extends inward of said supporting element so that the closed opening (2) and the object (3) is completely permanently sealed.

7. An apparatus, as set forth in claim 6, wherein the bags (9, 10) have a longitudinal extent extending in a circumferential outer peripheral surface direction of the object (3).

8. An apparatus, as set forth in claim 6, wherein the bags (9, 10) are formed of a low permeability woven fabric.

9. An apparatus, as set forth in claim 6, wherein the bags (9, 10) are formed of a porous material.

10. An apparatus, as set forth in claim 6, wherein the supporting element (5, 6) has inlets (12, 13) connected to the bags (9, 10) for supplying the sealing agent into the bags.

11. An apparatus, as set forth in claim 6, wherein the supporting element (5, 6) has a flange (7, 8) arranged at one end thereof and positioned to project radially outwardly of the opening (2) in the wall.

12. An apparatus as set forth in claim 10, wherein a container, holding a premeasured amount of the sealing agent, is arranged for temporary connection with the inlet (12, 13) to the bag (9, 10).

* * * * *